Figure 1:
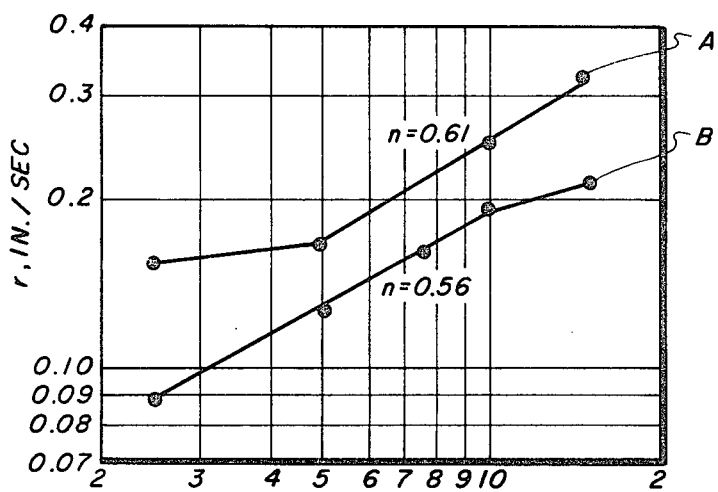

United States Patent [19]

Lo et al.

[11] 4,141,768
[45] Feb. 27, 1979

[54] FUEL RICH SOLID PROPELLANT OF BORON AND A FLUORO-NITRO-EPOXIDE POLYMER BINDER

[75] Inventors: George A. Lo, Canoga Park; Charles L. Hamermesh, Tarzana, both of Calif.

[73] Assignee: Rockwell International Corporation, El Segundo, Calif.

[21] Appl. No.: 48,588

[22] Filed: May 18, 1970

[51] Int. Cl.$^2$ .............................................. C06B 45/10
[52] U.S. Cl. .................... 149/19.3; 149/19.6; 149/20; 149/22
[58] Field of Search ............ 149/19, 22, 19.3, 19.6, 149/20

[56] References Cited

U.S. PATENT DOCUMENTS

| | | | |
|---|---|---|---|
| 3,130,096 | 4/1964 | Pruitt et al. ........................ | 149/19 |
| 3,344,167 | 9/1967 | Tyler et al. ........................ | 149/22 X |
| 3,441,518 | 4/1969 | Stogryn et al. .................... | 149/22 X |
| 3,441,520 | 4/1969 | Bosniak et al. .................... | 149/22 X |

Primary Examiner—Edward A. Miller
Attorney, Agent, or Firm—L. Lee Humphries; Robert M. Sperry

[57] ABSTRACT

A fuel-rich solid propellant gas generator is provided containing about 50 to 70% by weight of a boron fuel and about 30 to 50% by weight of an energetic binder containing a polymer of a dinitrofluoromethyl epoxide of the formula

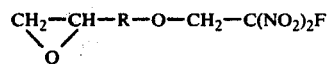

wherein R is alkylene of 1 to 4 carbon atoms.

10 Claims, 3 Drawing Figures

INVENTORS.
GEORGE A. LO
CHARLES L. HAMERMESH
BY D. Douglas Price
ATTORNEY

1

FUEL RICH SOLID PROPELLANT OF BORON AND A FLUORO-NITRO-EPOXIDE POLYMER BINDER

BACKGROUND OF THE INVENTION

Fuel-rich solid propellant gas generators are well-known in the art. Fuel-rich gas is gas which contains more than the stochiometric ratio of fuel to oxygen molecules based on the theoretical molecular oxygen requirement. Fuel-rich propellant systems presently considered for air-augmented rockets include metal slurries, metal-laden solid grains and hybrids of these two systems. Boron is one of the prime metallic fuel candidates. Boron slurry systems conventionally employ a hydrocarbon carrier fluid and an oxidizer such as chlorine trifluoride. A conventional solid grain system is one containing a hydrocarbon binder and an oxidizer such as ammonium perchlorate.

A solid propellant highly loaded with boron is a desirable propellant system for air-augmented rockets. However, with conventional non-energetic binders, solid oxidizer must be added to the fuel/binder composition to achieve satisfactory burning of the grain in the primary motor. As a result, processability becomes a problem. Presently, although boron loading of 60% has been reported with no particular processing difficulty, an expulsion efficiency problem has been encountered in these formulations due to the low oxidizer/binder ratio. The achievement of proper oxidizer/binder ratio is hindered by the minimum amount of binder required to attain satisfactory processability.

The dinitrofluoromethyl epoxide monomers employed according to the present invention are known compounds of the formula

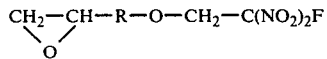

wherein R is alkylene of 1 to 4 carbon atoms. These monomers are prepared by first reacting an unsaturated aliphatic alcohol of the formula HO—R—CH=CH$_2$ with 1,1-dinitroethylene to produce the corresponding unsaturated ether CH$_2$=CH—R—O—CH$_2$—C(-NO$_2$)$_2$H wherein R is as defined above. The ether is then fluorinated and the resulting fluoroether is converted by direct oxidation with peracids of the formula R$_1$CO$_3$H wherein R$_1$ is alkyl, trifluoroalkyl or aryl such as phenyl or benzyl to the above identified dinitrofluoromethyl epoxide monomer.

The synthesis of the dinitrofluoromethyl epoxide monomers employed according to the present invention is illustrated by the preparation of glycidyl 2,2-dinitro-2-fluoroethoxide. The first step in the synthesis consists of the preparation of allyl 2,2-dinitroethyl ether according to the procedure set forth in *J. Org. Chem.*, 23, 813 (1958). This preparation consists of the addition of allyl alcohol to 1,1-dinitroethylene. 1,1-Dinitroethylene is a reactive intermediate generated in situ from 2-bromo-2,2-dinitroethyl acetate, 1,2-dichloro-1, 1-dinitroethane or 1,1,1-trinitroethane. 1,1-Dinitroethylene can be generated from 1,2-dichloro-1,1-dinitroethane according to the procedure set forth in *J. Org. Chem.*, 31, 369 (1966). The next step in the synthesis is the fluorination of allyl 2,2-dinitroethyl ether with perchloryl fluoride to form the corresponding allyl 2,2-dinitro-2-fluoroethyl ether. The fluorination is carried out in the presence of alkali. The final step of the synthesis consists in the epoxidation of the allyl 2,2-dinitro-2-fluoroethyl ether with peroxytrifluoroacetic acid to form the desired glycidyl 2,2-dinitro-2-fluoroethoxide. Other dinitrofluoromethyl epoxide monomers can be prepared by the above described synthesis by employing the appropriate alcohol such as 3-butene-1-ol, 2-methyl-3-butene-1-ol or 2-propen-1-ol.

The above described dinitroethylation, fluorination and epoxidation reactions are conveniently carried out at about atmospheric temperature and pressure. The initial temperature of the dinitroethylation is usually about 15 to 25° C. followed by agitation or stirring at room temperature for 10 to 15 hours. The starting temperature of the fluorination is reflux temperature followed by reaction at about 20° to 25° C. for about 3 to 4 hours. The epoxidation reaction is carried out at reflux temperature for about 1 to 3 hours. These reactions are usually performed in the presence of an inert solvent such as methylene chloride, carbon tetrachloride, chlorobenzene or chloroform.

The dinitrofluoromethyl epoxide polymers employed according to the present invention are known dihydroxy-terminated polyether polymers of the formula

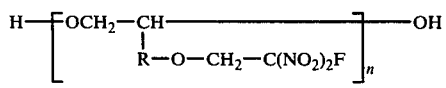

wherein R is as defined above and n is an integer from about 3 to 25. The dinitrofluoromethyl epoxide monomers are converted to liquid polymers of varying molecular weight by a catalytic reaction using a Lewis acid catalyst and an initiator containing hydroxy groups in the presence of an organic solvent. The polymerization is conducted by introducing the dinitrofluoromethyl epoxide monomer into a reaction flask containing solvent, adding a catalyst and then allowing the polymerization to proceed to the desired polymer. The course of the reaction can be followed by watching for the disappearance of the epoxy group. The polymerization can be terminated by adding water or any other suitable quenching material. The polymer is isolated from the reaction medium by first water extracting the solvent to remove the catalysts and then drying the extracted solvent and finally extracting the polymer with alcohol. The alcohol is evaporated to yield the polymer.

Suitable Lewis acid catalysts for polymerizing the dinitrofluoromethyl epoxide monomers are aluminum chloride, zinc chloride, ferric chloride, boron trifluoride hydrate and stannic chloride. Representative initiators containing an hydroxy group suitable for the epoxide polymerization are water, glycerine, glycols such as ethylene glycol, polypropylene glycol, polyethylene glycol, mixed polyethylene polypropylene glycols and glycerol. Suitable solvents include methylene chloride, carbon tetrachloride, ethylene chloride, methylene dichloride, methyl bromide and propyl chloride.

SUMMARY OF THE INVENTION

A fuel-rich solid propellant gas generator containing about 50 to 70% by weight of a boron fuel and about 30 to 50% by weight of an energetic binder containing a polymer of a dinitrofluoromethyl epoxide of the formula

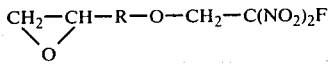

wherein R is alkylene of 1 to 4 carbon atoms.

DESCRIPTION OF THE INVENTION

An object of the present invention is the provision of a fuel-rich solid propellant gas generator for an air-augmented rocket.

Further objects and advantages will become apparent upon reading the undergoing specification and claims.

The present invention is directed to the provision of a fuel-rich solid propellant gas generator for an air-augmented rocket system. The fuel of choice is boron. The binder of choice is based on an energetic, thermally stable polymer of a dinitrofluoromethyl epoxide of the formula

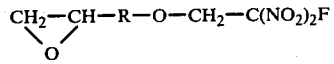

wherein R is alkylene of 1 to 4 carbon atoms. As opposed to conventional fuel-rich solid propellant gas generator systems based on non-energetic binders wherein solid oxidizer must be added to achieve satisfactory burning of the grain in the primary motor, the boron-rich solid propellant gas generator system of the present invention requires no addition of solid oxidizer since the binder system is energetic. However, high flexibility of the ballistic properties of the gas generator can be achieved by addition of solid oxidizer.

The energetic binder system comprises a dinitrofluoromethyl epoxide polymer, a curing agent for the polymer and preferably a plasticizer. The dinitrofluoromethyl epoxide polymers are liquid dihydroxy-terminated polyether polymers of the formula

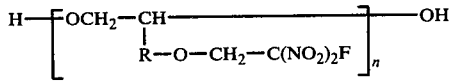

wherein R is as defined above and n is an integer from about 3 to 25. The gas generator system preferably contains about 10 to 20% by weight based on the total weight of the gas generator system of the dihydroxy-terminated polyether polymer. The fuel-rich system preferably contains about 18 to 30% by weight based on the total weight of the fuel-rich system of a plasticizer for the polyether polymer. It is preferred that the plasticizer be energetic. The plasticizer of choice is bis(2-fluoro-2,2-dinitroethyl)formal. Bis(2-fluoro-2,2-dinitroethyl)formal is a known plasticizer which can be prepared according to the procedure set forth in *J. Org. Chem.*, 33, No. 8, 3073 (1968) or *Tetrahedron*, 1, No. 19, 219 (1963). The energetic binder is cured by employing about 1 to 3% by weight based on the total weight of the solid propellant of a curing agent. Examples of suitable curing agents are polymethylene, polyphenyl isocyanate, hexamethylene diisocyanate, bis-isocyanatophenyl methane, toluene diisocyanate and 3-nitraza-1,5-pentane diisocyanate. Conventional curing catalysts such as metal salts of acetylacetone can be employed when desired.

The polyether polymer employed according to the present invention possesses high thermal stability, impact sensitivity and density. The preferred polyether polymer is poly(glycidyl 2,2-dinitro-2-fluoroethoxide). This polymer has high functionality with a suitable molecular weight range and liquid viscosity, good thermal stability, high energy and density and a relatively simple preparative route as discussed previously.

The fuel-rich solid propellant gas generator of the present invention has high impulse performance coupled with high primary combustion exit temperature and favorable boron species in the primary motor exhaust. The system is insensitive to impact and possesses excellent thermal stability at elevated temperatures. Additionally, the system is readily castable since the addition of solid oxidizers is not required. However, high flexibility of the ballistic properties of the gas generator can be achieved by addition of solid oxidizer. Suitable solid oxidizers are ammonium, alkali metal and alkaline earth metal salts of nitric, perchloric and chloric acid, ammonium nitrate, ammonium perchlorate, hydroxylammonium perchlorate, potassium perchlorate, lithium perchlorate, calcium nitrate, barium perchlorate, cyclotetramethylene tetranitramine and tetrakis-(trinitroethyl) orthocarbonate. If solid oxidizer is employed, it is preferably employed in the amount of about 5 to 20% by weight based on the total weight of the solid propellant. The oxidizers are preferably powdered to a particle size of about 10 to 350 microns.

Since the energetic binder system needs no addition of solid oxidizer, its higher liquid volume before curing provides more flexibility than, for example, the conventional ammonium perchlorate/carboxy-terminated polybutadiene systems. The prominent advantage of the energetic binders employed according to the present invention are their primary chamber exit flame temperatures which are between 300° to 400° Kelvin higher than systems using an inert binder. Additionally, the fuel-rich solid propellant gas generators of the present invention appear to have the additional advantage over, for example, boron/ammonium perchlorate/carboxy-terminated polybutadiene propellants of having a larger mole percent of boron entering the secondary combustion zone as elemental boron.

Figure 2:
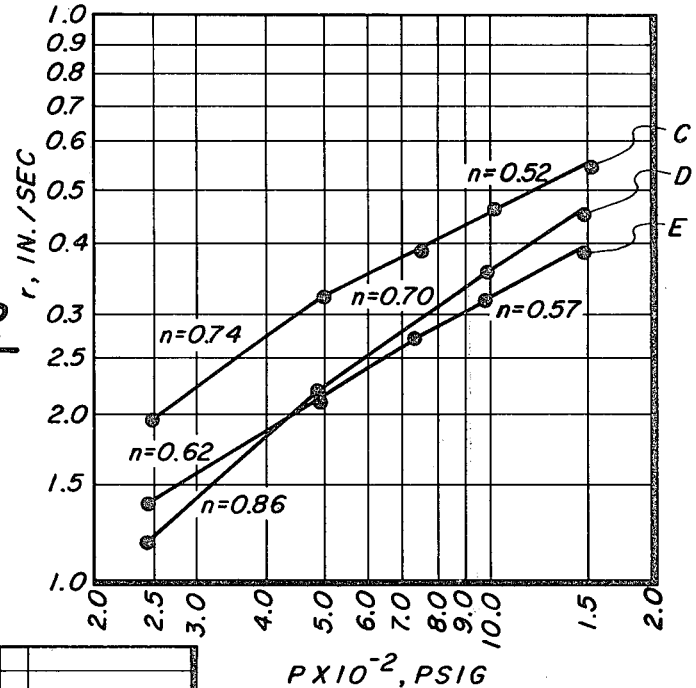
Figure 3:
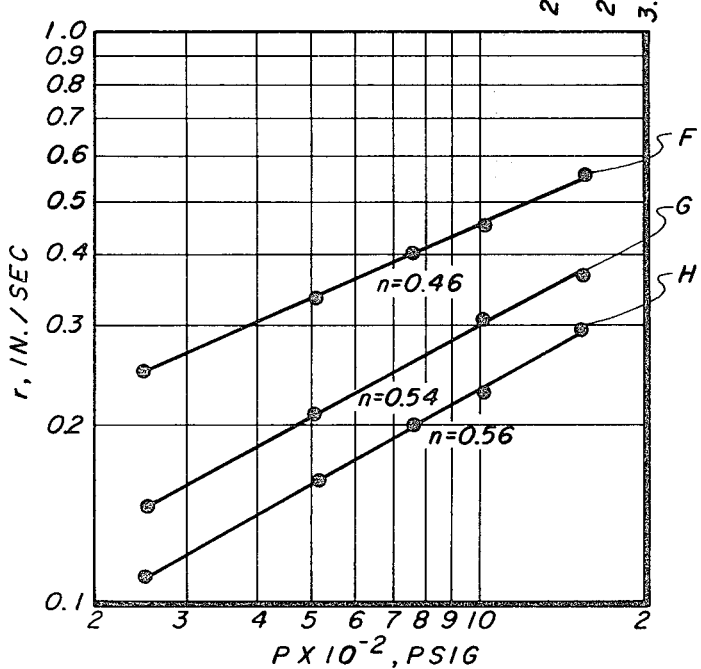

Liquid strand burning rate studies on a boron/poly(-glycidyl 2,2-dinitro-2-fluoroethoxide) [P-GDNFE]/bis(2-fluoro-2,2-dinitroethyl)formal [FEFO] propellant system have been conducted. The results of these studies are shown in FIGS. 1, 2 and 3. Each of FIGS. 1, 2 and 3 represent in graphic form the burning rate behavior of specified compositions. The propellant burn rate (r) in inches per second is shown on the ordinate. The pressure in pounds per square inch gage is shown on the abscissa. The burn rate pressure exponent (n) is also given for each composition. Referring to FIG. 1, Composition A contained 50% boron, 30% FEFO and 20% P-GDNFE. Composition B contained 65% boron, 21% FEFO and 14% P-GDNFE. Referring to FIG. 2, Composition C contained 50% boron, 15% ammonium perchlorate (AP), 21% FEFO and 14% P-GDNFE. Composition D contained 50% boron, 10% AP, 24% FEFO and 16% P-GDNFE. Composition E contained 58% boron, 7.5% AP, 20.7% FEFO and 13.8% P-GDNFE. Referring to FIG. 3, Composition F contained 50% boron, 20% potassium perchlorate, 18% FEFO and 12% P-GDNFE. Composition G contained 50% boron, 15% tetrakis-(trinitroethyl)orthocarbonate, 21% FEFO and 14% P-GDNFE. Composition H contained 50% boron, 20% cyclotetramethylene tetranitramine, 18%

FEFO and 12% P-GDNFE. The formulations without any oxidizer or additive as shown in FIG. 1 show acceptable burning rates (0.19 and 0.25 inches per second at 1000 psig) while displaying pressure exponents of 0.56 and 0.61. This compares favorably with conventional fuel-rich systems.

The following non-limitative examples illustrate the invention:

EXAMPLE 1

Preparation of allyl 2,2-dinitroethyl ether: Fifty grams (0.264 mole) of 1,2 dichloro-1,1-dinitroethane were added dropwise over a 15 minute period to a well stirred mixture of 200 ml of methylene chloride, 85.5 grams (1.48 moles) of allyl alcohol and 219 grams (1.32 moles) of potassium iodide. The reaction temperature of the slightly exothermic reaction was kept at 20–25° C. by employing an ice bath. The resulting red solution was stirred at room temperature for 12 hours. About 200 ml of water was added to dissolve the inorganic salts and the layers were separated. The water layer was extracted with methylene chloride and the combined organic portion was then washed several times with a 10 percent sodium thiosulfate solution to remove iodine. After a final water wash, the methylene chloride solution was dried over magnesium sulfate. Removal of excess methylene chloride yielded a red oil and a white solid. These materials were separated by crystallization of the solid from carbon tetrachloride. The white solid was found to be 1,2-diiodopropanol and the red oil was crude allyl 2,2-dinitroethyl ether. The crude allyl 2,2-dinitroethyl ether was purified by first forming the potassium salt through reaction with potassium hydroxide, recrystallization from methanol, and then acidifying to pH of 1 with hydrochloric acid. The resulting pure allyl 2,2-dinitroethyl ether was obtained in 55 percent overall yield as a colorless oil, $n_D^{27.5}$ 1.4527, $d^{25}$ 1.3. The calculated elemental analysis for $C_5H_8N_2O_5$ was c, 34.09; H, 4.55; N, 15.19. The found analysis was C, 34.20; H, 4.29; N, 16.11. Infrared spectrum for the compound, in Nujol, exhibited maximum peaks at 6.35, 7.5 and 9.0 microns.

EXAMPLE 2

Preparation of allyl 2,2-dinitro-2-fluoroethyl ether: The pure allyl 2,2-dinitroethyl ether, prepared according to the procedure set forth in Example 1, was added (4.11 grams; 0.0234 mole) slowly to a well stirred solution of sodium hydroxide (0.935 grams; 0.0234 mole), water (15 mls) and methanol (34 mls). The slightly exothermic reaction yielded an immediate orange color. The final pH was approximately 8. Perchloryl fluoride was then metered into the system to which was added a dry ice reflux condenser to prevent excess perchloryl fluoride from sweeping out of the reaction flask. When the perchloryl fluoride began to reflux vigorously, it was shut off and under slight nitrogen flow reflux was maintained for about 4 hours. The reaction temperature was maintained between 20°–25° C. with a water bath. The reaction mixture changed from deep orange to pale orange in color. Water (50 mls) was added and a yellow oil dropped out of solution. The mixture was then extracted with three 60 ml portions of methylene chloride. The methylene chloride extracts were washed with three 30 ml portions of 3 percent sodium hydroxide and finally with water. After drying with magnesium sulfate, excess methylene chloride was removed under vacuum and the residual liquid was distilled through a small Vigreux column. The distillation yielded 2.4 grams (53% yield) of allyl 2,2-dinitro-2-fluoroethyl ether, b. p. 42° C./1.1 mm, $n_D^{25}$ 1.4240, $d^{25}$ 1.28. The calculated elemental analysis for $C_5H_7N_2O_5$ was C, 30.93; H, 3.64; N, 14.43. The found analysis was C, 30.85; H, 3.45; N, 14.43. The infrared spectrum for the compound, in Nujol, exhibited maximum peaks at 6.2, 7.6 and 9.0 microns.

EXAMPLE 3

Preparation of glycidyl 2,2-dinitro-2-fluoroethoxide: A solution of peroxytrifluoroacetic acid was prepared from 0.78 ml (0.028 mole) of 90 percent hydrogen peroxide, 4.73 ml (0.0335 mole) of trifluoroacetic anhydride and 10 ml of methylene chloride. This reagent was added over a 25 minute period to a well stirred boiling mixture of 3.18 g (0.0164 mole) of allyl 2,2-dinitro-2-fluoroethyl ether, 25 ml methylene chloride, and 12.4 g (0.088 mole) of disodium hydrogen phosphate (predried in vacuum oven overnight at 50° C.). After the mild exothermic reaction has subsided, the solution was heated under reflux for 2 additional hours. The resulting mixture was stirred with 60 ml of water until all the inorganic salts had dissolved. The organic layer was separated and the aqueous layer was extracted with three 25 ml portions of methylene chloride. The combined methylene chloride portion was washed with 50 ml of 10 percent sodium bicarbonate and dried over magnesium sulfate. The solvent was removed at reduced pressure and the residual liquid was fractionated through a small Vigreux column to yield 1.99 g (58% yield) of glycidyl 2,2-dinitro-2-fluoroethoxide, b.p. 66° C./0.15 mm, $n_D^{28}$ 1.4350, $d^{25}$ 1.45. The calculated elemental analysis for $C_5H_7N_2O_6F$ was C, 28.6; H, 3.36; N, 13.33. The found analysis was C, 28.78; H, 3.29; N, 13.46. The infrared spectrum for the compound, in Nujol exhibited maximum peaks at 6.25, 7.65, 9.4 and 11.10 microns.

EXAMPLE 4

Polymerization of glycidyl 2,2-dinitro-2-fluoroethoxide: To a reaction flask consisting of a two-necked 100-milliliter round-bottom flask wherein one neck was fitted with a 4-millimeter vacuum stopcock and the other neck stoppered for use in the introduction and removal of reagents and samples was added 1.50 grams (7.13 mmoles) of glycidyl 2,2-dinitro-2-fluoroethoxide and 20 milliliters of methylene chloride. The contents of the flask were next frozen in a liquid nitrogen bath and the flask was opened to the vacuum line. After pumping the flask down to 20 microns pressure, 60.1 cc of boron trifluoride at a pressure of 100 millimeters was condensed into the reaction flask. The reaction flask was then removed from the vacuum line and gently warmed to room temperature and, as soon as the monomer solution thawed, stirring was accomplished with a magnetic stirring bar. The reaction was allowed to proceed for 1–2 hours or until the 11.1 micron epoxide band in the infrared spectrum had disappeared. The samples were removed for infrared examination by first opening the reaction flask's stopcock under a nitrogen flow and, after the contents of the flask were blanketed with nitrogen, the sidearm stopper was removed and a sample was withdrawn with a hypodermic syringe. After completion of the reaction, approximately 10 milliliters of water was added to the reaction flask and stirring continued for several minutes. The contents of the flask were then transferred to a 125-milliliter separatory funnel. After two additional water washes of the methylene chloride solution, the sample was dried over anhydrous sodium sulfate and the sodium sulfate was washed with methylene chloride several times. The washes were combined with the decanted solution. Finally, the methylene chloride was evaporated under vacuum. The polymer residue produced was dissolved in methanol and filtered through a conventional millipore filter to remove small quantities of insoluble solids. Following vacuum removal of the methanol, the liquid polymer was dried in a vacuum oven at 40° C. for several days. The yield of polymer was quantitative.

EXAMPLE 5

Other polymers prepared according to the procedure of Example 4 are set forth in the table below:

Table

Polymerization of Glycidyl 2,2-Dinitro-2-Fluoroethoxide

| Monomer/Catalyst (Molar)[2] | $H_2O/BF_3$ (Molar) | Temperature | Functionality [3] | $\overline{M}_n$ [4] |
|---|---|---|---|---|
| 8:1 | 0.34 | RT | 0.8 | 1068 |
| 17:1 | 0.7 | RT | 0.71 | 1257 |
| 33:1 | 1.35 | RT | 0.74 | 1378 |
| 68:1 | 2.8 | RT | 1.1 | 1473 |
| 22:1 | 1.0 | RT | 0.58 | 1157 |
| 11:1 | 0.5 | −78° | 0.66 | 1643 |
| 22:1 | 10.0 | RT | * | 850 |
| 5.5:1 | 0.67 | RT | 0.85 | 1311 |
| 22:1 | 0.076 | RT | 0.57 | 866 |
| 22:1 | 0.11[1] | RT | 1.5 | 2660 |
| 22:1 | 10.0 | RT | 1.9 | 784 |
| 22:1 | 5.0 | RT | 1.6 | 1060 |
| 22:1 | 0.29[1] | RT | 1.2 | 2460 |

* Strong OH in infrared.
[1] Solvent was carbon tetrachloride, all other runs carried out in methylene chloride solvent.
[2] Catalyst was Lewis acid $BF_3$.
[3] Functionality indicates the average number of OH groups per polymer chain.
[4] $\overline{M}_n$ indicates the average molecular weight of the polymer.

The parameters that were used to characterize the polymers were functionality and molecular weight. Functionality is indicative of the number of hydroxyl groups per polymer molecule and was determined by the diborane method. This method involves the reaction of diborane with prototonic material and subsequent measurement of the evolved hydrogen: $B_2H_6 + 6 ROH \rightarrow 2B(OR)_3 + 6H_2$. The apparatus consists of a reaction vessel fitted with a serum cap and a manometer. The vessel contains excess diborane-tetrahydrofuran solution into which the weighed, carefully dried sample is injected with a syringe. The resulting hydrogen evolution is then measured. The method was modified somewhat in that the diborane-tetrahydrofuran solution was metered onto a carefully weighed unknown sample contained in a vessel evacuated on a vacuum system. The hydrogen evolved is then removed with a Toepler pump and carefully measured. The analysis is quite rapid requiring approximately 30 minutes per sample. The method is especially suitable for epoxy compounds and sterically hindered hydroxy compounds. Nitro, nitraso and other energetic groups do not interfere with the analysis. The other parameter, that is, molecular weight, was measured with the Mechrolob Vapor Phase Osmometer.

EXAMPLE 6

The ingredients for a propellant formulation were individually weighted out according to the following weight percent composition: 50 boron/30 bis(2-fluoro-2,2-dinitroethyl)formal/20 poly(glycidyl 2,2-dinitro-2-fluoroethoxide). The ingredients were then placed in a ¼ pint vertical mixer and were mixed under ambient temperature and pressure conditions for 20 minutes. The propellant formulation was then vacuum cast into 4" length by ¼" diameter butyrate plastic tubing to form burning rate strands. The viscosity of this propellant formulation was determined to be 0.14 kilopoise by the use of a Brookfield viscometer. The liquid strand burning rate data obtained for this propellant is shown by curve A in FIG. 1.

EXAMPLE 7

The ingredients for a propellant formulation were individually weighted out according to the following weight percent composition: 65 boron/21 bis(2-fluoro-2,2-dinitroethyl)formal/14 poly(glycidyl 2,2-dinitro-2-fluoroethoxide). The ingredients were then placed in a ¼ pint vertical mixer and were mixed under ambient temperature and pressure conditions for 20 minutes. The propellant prepared was then vacuum cast into 4" length by ¼" diameter butyrate plastic tubing to form burning rate strands. The viscosity of this propellant formulation was determined to be 1.3 kilopoises by the use of a Brookfield viscometer. The liquid strand burning rate data obtained for this propellant is shown by curve B in FIG. 1.

EXAMPLE 8

The ingredients for a propellant formulation containing ammonium perchlorate as an oxidizer were individually weighed out according to the following weight percent composition: 50 boron/10 ammonium perchlorate/24 bis(2-fluoro-2,2-dinitroethyl)formal/16 poly(glycidyl 2,2-dinitro-2-fluoroethoxide). The ingredients were then placed in a ¼ pint vertical mixer and were mixed under ambient temperature and pressure conditions for 20 minutes. The propellant prepared was then vacuum cast into 4" length by ¼" diameter butyrate plastic tubing to form burning rate strands. The liquid strand burning rate data obrained for this propellant is shown by curve D in FIG. 2.

EXAMPLE 9

The ingredients for a propellant formulation were individually weighed out according to the following weight percent composition: 50 boron/30 bis(2-fluoro-2,2-dinitroethyl)formal/18.17 poly(glycidyl 2,2-dinitro-2-fluoroethoxide)/1.80 polymethylene polyphenyl isocyanate [PAPI]/0.03 ferric acetylacetonate [FeAA]. All ingredients except PAPI and FeAA were then placed in a ¼ pound vertical mixer under ambient temperature and pressure conditions for 20 minutes. The curing agent PAPI was then added and the ingredients were then mixed under vacuum for another 15 minutes. The cure catalyst FeAA was added last and the mixing under vacuum was extended for an additional 10 minutes. The propellant formulation was then vacuum cast into 4" length by ¼" diameter butyrate plastic tubing and cured by placing the sample in an oven with a temperature of 50° C. for 48 hours. Qualitative inspection showed that the propellant cured in an acceptable manner.

EXAMPLE 10

Following the procedure of Example 9, a propellant formulation with a weight percent composition of 65 boron/21 bis(2-fluoro-2,2-dinitroethyl)formal, 12.67 poly(glycidyl 2,2-dinitro-2-fluoroethoxide)/1.30 polymethylene polyphenyl isocyanate/0.03 ferric acetyl acetonate was prepared and cured in an oven with a temperature of 50° C. for 48 hours. Qualitative inspection showed that the propellant cured in an acceptable manner.

EXAMPLE 11

Following the procedure of Example 9, a propellant formulation with a weight percent composition of 50 boron/10 ammonium perchlorate/24 bis(2-fluoro-2,2-dinitroethyl)formal/14.5 poly(glycidyl 2,2-dinitro-2-fluoroethoxide)/1.47 polymethylene polyphenyl isocyanate/0.03 ferric acetyl acetonate was prepared and cured in an oven with a temperature of 50° C. for 48 hours. Qualitative inspection showed that the propellant cured in an acceptable manner.

We claim:

1. A fuel-rich solid propellant gas generator comprising about 50 to 70% by weight of metallic boron as a fuel and about 30 to 50% by weight of an energetic binder comprising a polymer of a dinitrofluoromethyl epoxide of the formula

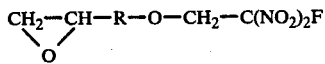

wherein R is alkylene of 1 to 4 carbon atoms.

2. The gas generator of claim 1 in which the dinitrofluoromethyl epoxide polymer has the formula

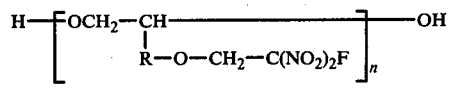

wherein R is alkylene of 1 to 4 carbon atoms and n is an integer of from about 3 to 25.

3. The gas generator of claim 1 in which the gas generator contains from about 18 to 30% by weight of a plasticizer.

4. The gas generator of claim 3 in which the plasticizer is bis(2-fluoro-2,2-dinitroethyl)formal.

5. The gas generator of claim 1 in which R is methylene.

6. The gas generator of claim 1 in which the gas generator contains from about 5 to 20% by weight of an oxidizer.

7. A fuel-rich solid propellant gas generator comprising about 50 to 70% by weight of metallic boron as a fuel, about 10 to 20% by weight of a dihydroxy-terminated polyether polymer of the formula

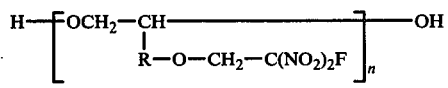

wherein R is alkylene of 1 to 4 carbon atoms and n is an integer of from about 3 to 25, about 18 to 30% by weight of a plasticizer and about 1 to 3% by weight of a curing agent.

8. The gas generator of claim 7 in which R is methylene.

9. The gas generator of claim 7 in which the curing agent is polymethylene polyphenyl isocyanate.

10. The gas generator of claim 7 in which the plasticizer is bis(2-fluoro-2,2-dinitroethyl)formal.

* * * * *